June 9, 1931.  W. GREIM  1,809,272
SUPPORTING STRUCTURE
Filed Oct. 15, 1922
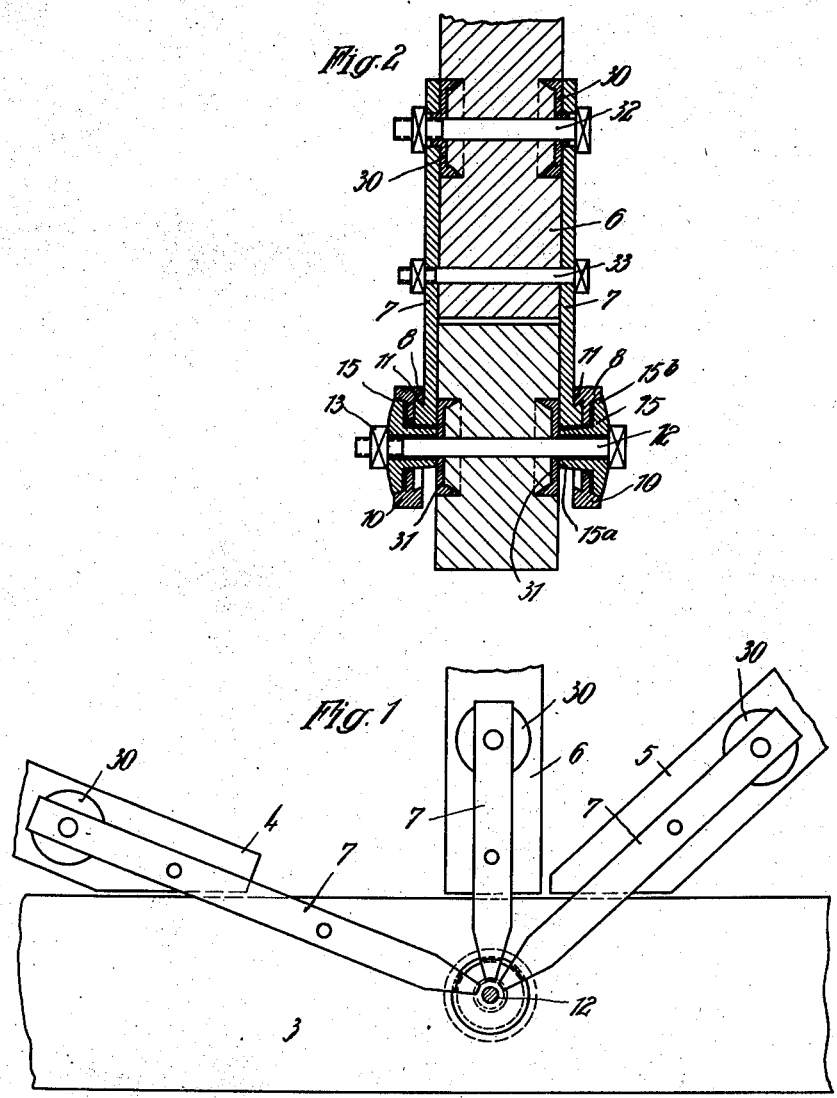

Patented June 9, 1931

1,809,272

UNITED STATES PATENT OFFICE

WALTHER GREIM, OF BERLIN, GERMANY, ASSIGNOR TO SIEMENS-BAUUNION GESELLSCHAFT MIT BESCHRÄNKTER HAFTUNG KOMMANDITGESELLSCHAFT, OF BERLIN-SIEMENSSTADT, GERMANY, A CORPORATION OF GERMANY

SUPPORTING STRUCTURE

Application filed October 15, 1928, Serial No. 312,570, and in Germany October 19, 1927.

My invention relates to improvements in supporting structures, and more particularly to assemblage or junction points of such structures, in which a plurality of converging bars are joined together to form a joint resisting tension and compression strains and permitting said bars to adjust themselves relatively to each other. According to one of my patents of prior date this joint is effected through the agency of joint discs which engage the ends of the bars (in the case of iron rods the eyes and in the case of wooden bars the ends of straps mounted on the bars) and as a rule are in pairs drawn towards the bars and each other by a transverse bolt.

My present invention consists of an improvement in such assemblage or junction points by employing mushroom-shaped washers or washers with bosses for the transverse connecting bolt, which washers transmit the pressure of the bolt with a wedge action on to the said joint discs.

In the drawings affixed hereto and forming part of my specification one embodiment of my invention is illustrated by way of example.

In the drawings:

Fig. 1 represents a side-elevation of my improved assemblage or junction point for wooden supporting structures; and Fig. 2, a cross-section through this assemblage or junction point.

Referring to the drawings it will be observed that in the junction point illustrated three bars, for instance timbers, 4, 5, 6 converge toward a common point on a horizontal bar or timber 3. The bars are on each side provided with a strap 7 attached by pronged discs 30 and bolts 32 passing through their hubs or bosses and also by bolts 33 without pronged discs. The straps 7 are provided with converging ends extending beyond the bars and are here provided with a dove-tailed hook element 8, by means of which they engage the correspondingly dove-tailed joint discs 10, the circumferential flange 11 of which is adapted to hold them in position. At the assemblage or junction point there are also provided pronged discs 31 at both sides of the horizontal bottom bar 3 against which discs the aforementioned straps 7 rest. The joint is drawn together by a transverse bolt 12 and nut 13.

According to my invention the pressure of this bolt 12 is transmitted to the joint discs 10 by washers 15. These washers 15 are mushroom-shaped and their bosses or hubs 15a enveloping the transverse bolt 12 are so long that they extend through the joint discs 10 and past the flanges 8 of the straps 7 close up to the pronged plates 31. At the periphery each washer 15 is provided with an inwardly beveled face 15b, which abuts against a corresponding beveled edge of a recess in the joint disc 10.

In consequence of this construction of the mushroom-shaped washer and the joint discs all the parts of the assemblage or junction point are forced together with a wedge action, when the nut 13 on the bolt 12 is tightened. In this way it is possible to assemble the joint quickly and easily, to center the constituent parts well and to adjust the friction in the joint and thus its stiffness in a simple and convenient manner.

The mushroom-shaped washer has a further object, which is of great importance as regards the strength of the joint. In consequence of the eccentric engagement of the rods or the straps of the bars at the joint discs bending stresses are set up in said discs, which might lead to their warping, unless they should be made excessively strong by a great expenditure of material. The circumferential edge 15b of the mushroom-shaped washer counteracts these stresses and powerfully braces the joint discs against these bending stresses, so that a warping of the discs is effectively avoided, even if they are made comparatively thin.

Various modifications and changes may be made without departing from the spirit and the scope of the invention.

I claim as my invention:—

A supporting structure comprising in combination a plurality of bars converging towards a common assemblage point at a structural element, joint discs, arranged on opposite sides of this element, each bar having two suitably shaped lateral ends extending respectively to the two discs, each disc being undercut inwardly for slidingly engaging all bar ends of its pertaining side, and a transverse bolt in said element for joining said discs, whereby said bars are joined in a common plane, and whereby a joint is formed which resists tension and compression stresses and which permits said bars to adjust themselves relatively to each other, each of said discs having a bevelled recess at its outer face, and a mushroom-shaped washer disposed at each end of said bolt and having a bevelled rim to fit into the bevelled recess of the disc at the pertaining bolt end, so that when said washers are drawn by said bolt tightly against the structural element said discs are supported against eccentric stresses set up by said bars.

In testimony whereof I affix my signature.

WALTHER GREIM.